(12) United States Patent
Chen et al.

(10) Patent No.: US 8,392,539 B1
(45) Date of Patent: Mar. 5, 2013

(54) OPERATING SYSTEM BANKING AND PORTABILITY

(75) Inventors: Shih-Yun Chen, Pingtung (TW);
Chun-Chieh Wang, Banciao (TW);
Wei-Chin Chen, Xindian (TW)

(73) Assignee: Trend Micro, Inc., Tokyo (JP)

( * ) Notice: Subject to any disclaimer, the term of this patent is extended or adjusted under 35 U.S.C. 154(b) by 1185 days.

(21) Appl. No.: 12/051,660

(22) Filed: Mar. 19, 2008

(51) Int. Cl.
*G06F 15/177* (2006.01)
*G06F 9/00* (2006.01)
*G06F 11/00* (2006.01)

(52) U.S. Cl. .................. 709/220; 713/2; 714/15; 726/22

(58) Field of Classification Search .......... 709/220–222; 713/2; 726/22–24; 714/15
See application file for complete search history.

(56) References Cited

U.S. PATENT DOCUMENTS

| | | | | |
|---|---|---|---|---|
| 6,131,116 A * | 10/2000 | Riggins et al. | ................. | 709/219 |
| 7,784,098 B1 * | 8/2010 | Fan et al. | ........................ | 726/25 |
| 2005/0086030 A1 * | 4/2005 | Zeidman | ........................... | 703/1 |
| 2006/0047946 A1 * | 3/2006 | Keith, Jr. | ........................... | 713/2 |
| 2006/0200571 A1 * | 9/2006 | Backman | ..................... | 709/230 |
| 2006/0236085 A1 * | 10/2006 | Norton | ............................... | 713/2 |
| 2006/0242707 A1 * | 10/2006 | Tang et al. | ..................... | 726/23 |
| 2007/0143591 A1 * | 6/2007 | Dellacona | ......................... | 713/2 |
| 2008/0010684 A1 * | 1/2008 | Edwards et al. | ................ | 726/24 |
| 2009/0015847 A1 * | 1/2009 | Luo | ................................ | 358/1.1 |
| 2009/0055822 A1 * | 2/2009 | Tolman et al. | .................... | 718/1 |
| 2009/0100158 A1 * | 4/2009 | Sonkin et al. | ................. | 709/221 |

* cited by examiner

*Primary Examiner* — Jeong S Park
(74) *Attorney, Agent, or Firm* — Beyer Law Group LLP

(57) ABSTRACT

A user is able to save his operating system settings to a web server. The user may then download these known, clean operating system over the Internet to the same computer in the future or to a different computer. Or, a user is able to save a known, good restore point to a secure site on the web. If the user suspects that his computer has been compromised by malware, the user downloads this original restore point from over the Internet. The computer is then restored to a known, good state prior to the malware infection. In addition, an entire operating system is present on a USB drive and the user runs his computer from the USB drive. The USB drive is inserted into a publicly-accessible computer. Drivers and network settings from the computer are installed on the USB drive and the operating system on the USB drive then reboots and executes on the computer.

31 Claims, 8 Drawing Sheets

OS Settings on Web

OS Settings on Web

Restore Point on Web

Example User Interface

OPERATING SYSTEM BANKING AND PORTABILITY

FIELD OF THE INVENTION

The present invention relates generally to prevention of malicious software on a computer. More specifically, the present invention involves a technique for saving an operating system and its settings.

BACKGROUND OF THE INVENTION

These days is a great deal of malicious software that affects not only a user's computer at home or in the office, but may also affect any other public computer or temporary computer that a user might use when on the road or away from the office. Especially when a user is using a public computer or a computer other than their own, there is no guarantee that any required antivirus software has been installed or is in use. It is entirely possible that malicious software might modify the operating system or settings of this other computer of the user without the user noticing. For example, even though the user may have backed up his operating system settings on his own office computer, he is unable to take those settings with him if he travels and uses another computer. This malicious software may even modify the operating system of the user's own computer if antivirus software is not being used.

Examples of malicious software that might affect an operating system or its settings include malware that runs immediately upon system startup, malware that modifies an operating system causing it to be prone to a pharming attack, malware that performs DNS spoofing, malware that hijacks an Internet browser, etc. For example, malware might destroy or modify operating system settings, or the malware might destroy a restore point for the operating system that the user had previously created in order to remedy a malware attack.

It is desirable for user to be able to recover from such a malware attack that affects an operating system, its settings, or the state of a computer.

Furthermore, it is usually difficult if not impossible for a user to determine that a public computer he or she is using (such as a computer at a library, Internet café, hotel business center, etc.) is free for many malware. Either there is no antivirus software present on the computer or the user is unable or unwilling to run such software before beginning work. In particular, in the past a user of a public computer was required to download special antivirus software or perhaps do an online scan in order to ensure that no malicious software such as key logger software or Trojan horse software was present on the public computer. Absent these procedures, a user had to be extremely careful about typing in sensitive information. Another difficulty of using a public computer is that the user may require certain software for his or her activities that is not present on the public computer.

It is therefore desirable for a user to be able to use a public computer without having to worry about malicious software or the absence of needed software.

SUMMARY OF THE INVENTION

To achieve the foregoing, and in accordance with the purpose of the present invention, a technique for storing or saving and operating system and its settings is disclosed that allows the retrieval or later use of the operating system.

In a first embodiment of the present invention, a user is able to save his or her operating system settings to a secure site on the web. If the user suspects that a computer has been compromised by malware, the user may then download these known, clean operating system over the Internet. The user's computer is then less prone to a pharming attack, malware that performs DNS spoofing, or malware that can hijack an Internet browser. Other advantages include reducing the load on the client computer by using storage over the Internet and providing the capability for the user to download clean operating system settings no matter which computer he is using and no matter where his or her travels take him.

In a second embodiment of the present invention, a user is able to save a known, good restore point to a secure site on the web. If the user suspects that his or her computer has been compromised by malware, the user may then download this original restore point from over the Internet. The computer may then be restored to a known, good state prior to the malware infection. Other advantages include reducing the load on the client computer by using storage over the Internet and providing the capability for the user to download a clean restore point no matter which computer he or she is using.

In a third embodiment of the present invention, an entire operating system is able to be saved onto a USB drive and the user runs his or her computer from the operating system on this USB drive. Advantages include the ability to prevent malicious software such as spyware, key logger software and Trojan horse software from affecting the user that is using a public computer. Further, the user is assured that the operating system on the USB drive is up-to-date and has all security patches installed. Any antivirus software that the user desires is already present on the USB drive, along with the desired operating environment for the user.

Simply by carrying with him a USB drive with the operating system environment installed, the user may then safely use any public computer at any location. The user may also elect to keep data and other files present on the USB drive in order to have a full working environment on this portable device.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
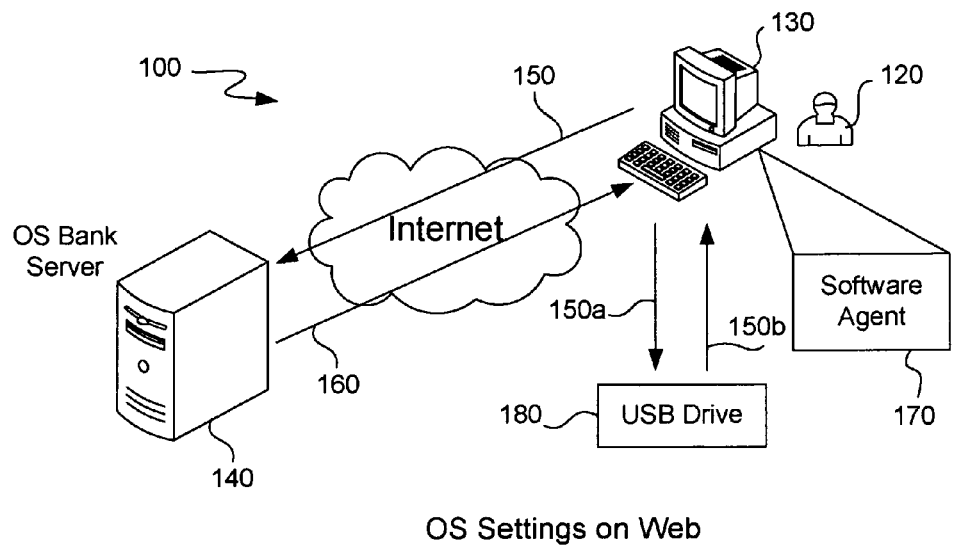
FIG. 1 illustrates an operating system deposit system according to one embodiment of the invention.

In one embodiment of the invention, a server available over the Internet is used to store known clean operating system settings from a user computer. If the user were to use another computer he can simply access the server in order to retrieve his known clean operating system settings to install on his current local computer. In one sense, the user is "banking" his known operating system settings for later use in a so-called "bank" server.

The following operating system settings, files and programs (among others) are useful to store on such a bank server. Because some malware masquerades as a startup program and can run immediately when the computer boots up (potentially upgrading itself or storing user data), it can be useful to store the operating system startup programs on the central server. A comparison may be used to detect whether the list of local startup programs is in fact a valid list and is equivalent to the startup program list stored on the server (and is not infected). For example, one can compare the local startup program list with the list stored on the bank server, and then one will know if the startup program list has been modified without the user's awareness. Because the list of startup programs are recorded in the registry keys, one can use this list to synchronize or to compare the list which is stored on the bank server.

The Registry keys most often involved with startup include the word "Run." They are listed below (using the abbreviation HKLM for the major key (or "hive") called "HKEY_LOCAL_MACHINE" and HKCU for the hive "HKEY_CURRENT_USER"):

HKLM\Software\Microsoft\Windows\CurrentVersion\Run
HKLM\Software\Microsoft\Windows\CurrentVersion\RunOnce
HKLM\Software\Microsoft\Windows\CurrentVersion\RunServices
HKLM\Software\Microsoft\Windows\CurrentVersion\RunServicesOnce
HKCU\Software\Microsoft\Windows\CurrentVersion\Run
HKCU\Software\Microsoft\Windows\CurrentVersion\RunOnce
HKCU\Software\Microsoft\Windows\CurrentVersion\RunOnceEx Some malware also modifies the user's host file which puts the user's computer at risk for a pharming attack (by connecting the user computer to a malicious Web server). The present invention can prevent such a pharming attack. The malware might change a DNS mapping or DNS settings causing the computer to connect to an illegitimate Web server. Storing a valid version of the host file on the server can combat this type of attack. Network settings may also be saved in order to combat DNS spoofing. In addition, saving settings for any suitable browser such as Internet Explorer, Mozilla Firefox, Netscape Navigator, Apple Safari, etc., may also be performed.

The service list is a list of processes typically running in the background of the user's computer. Under normal conditions, this list reflects known, acceptable processes that cause no harm. But, when malware infects a computer, there may be unfamiliar or suspicious services running in the background. Saving this service list to the bank server allows a comparison between the current service list on the local computer and this stored service list in order to detect suspicious services and to stop them if necessary.

Scheduled tasks are list of tasks scheduled to run them on the user's computer for beneficial purposes. For example, antivirus software may be scheduled to run once or twice a week to combat malware. Storing a list of the scheduled tasks for the user's computer to the bank server can be beneficial in that this saved list can then be compared to the current scheduled tasks on the local computer in order to detect malware that is attempting to run as a scheduled task.

Operating System Deposit Block Diagram

FIG. 1 illustrates an operating system deposit system 100 according to one embodiment of the invention. Included is a bank server 140 that may be located at any location accessible over the Internet. Bank server 140 may be any suitable computer hosting a common web server and database, for example, IIS with the ASPX program or an APACHE server with the PHP program. These programs handle the user accounts and settings mapping.

Computer 130 is any suitable computer that user 120 may be using, such as a personal computer, laptop computer, PC, Macintosh, portable computer, desktop computer, or any mobile computing device that could benefit by saving its operating system settings. The operating system may be a system from Microsoft, Apple, Linux, or other. Software agent 170 is a software module located on computer 130. This software in the form of an agent is located on any computer that the user chooses to use, and this agent helps the user boot up his current local computer with the retrieved operating system settings. The agent can also compare the operating system settings retrieved from the server with those operating system settings on the current local computer. The user can then choose to restore all of the retrieved operating system settings or can choose only specific settings to use.

More specifically, software on the bank server is used to associate a user account with their own settings. When the user logs in with his account and password, he can see his saved settings. Also, software agent 170 will communicate with this bank server 140 as well. When the user boots up his or her computer, software agent 170 will review the settings stored in the bank server 140, and if there are any settings that have been modified, the software agent 170 will pop up a warning and ask the user if he or she wants to restore the settings back to the original ones.

Communications 150 illustrate the uploading of operating system settings to the bank server and communications 160 illustrate downloading or retrieving these operating system settings from the server to the user's computer. It should be appreciated that the computer from which the user uploads known operating system settings may not be the same computer to which the user later downloads these settings. For example, the user may upload known settings from his office computer and then later download these settings to a different computer that he or she is using on the road.

Figure 2:
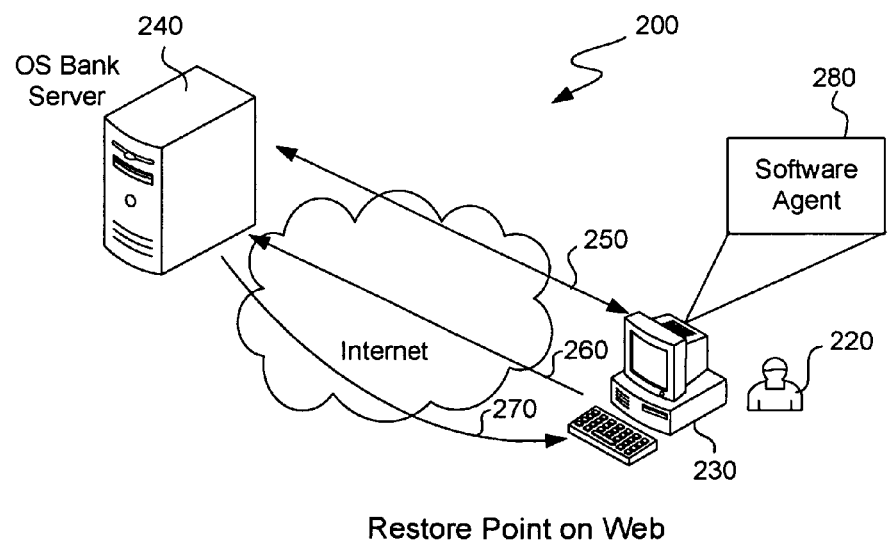
FIG. 2 illustrates an operating system deposit system according to another embodiment of the invention.

FIG. 2 illustrates an operating system deposit system 200 according to another embodiment of the invention. Included is a bank server 240, a computer 230, a user 220 and a software agent 280. Server 240, computer 230 and agent 280 share many of the same characteristics as their counterparts in FIG. 1. System 200 is arranged to create a restore point on computer 230 and upload this restore point to server 240. At some future time, the user may then download this known restore point from the server to his or her local computer, which may or may not be the same as computer 230. In this embodiment, software agent 280 is also arranged to create a restore point on computer 230.

Communications 250 represent the user scanning computer 230 using scanning software available from bank server 240. The result of this online scanning will be an indication as to whether the computer is free from viruses and other malware or not. Communications 260 represent uploading a restore point from computer 230 to bank server 240. Communications 270 represent downloading a previously stored restore point from the bank server to a local user computer in order to restore the computer back to a malware-free state. It should be appreciated that the computer from which the user uploads a known restore point may not be the same computer to which the user later downloads a restore point. For example, the user may upload a restore point from his office computer and then later download this restore point to a different computer that he or she is using on the road.

Software agent 280 also assists the user to boot up his current local computer using the retrieved a restore point. The agent can also compare the restore point retrieved from the server with a restore point created on the current local computer. The user can then choose to use the downloaded restore point or not.

Store Settings Flowchart

Figure 3:
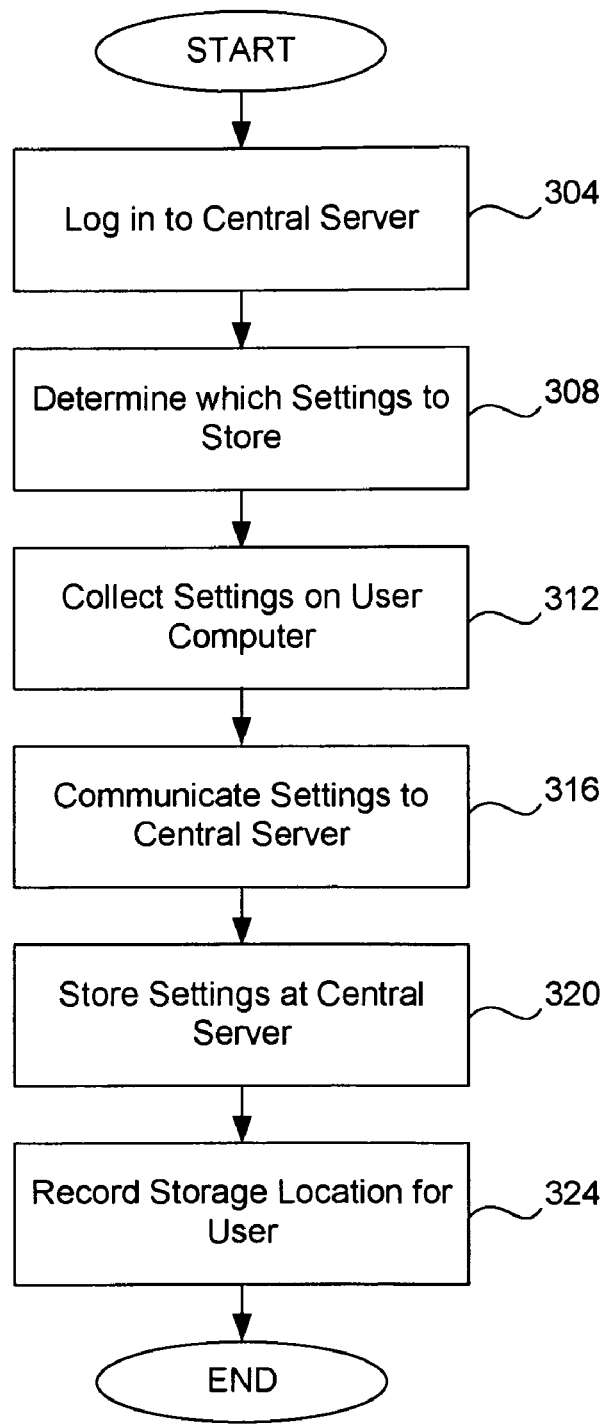
FIG. 3 is a flowchart describing one embodiment by which a user stores operating system settings of his or her local computer to a bank server available over the Internet.

FIG. 3 is a flowchart describing one embodiment by which a user stores operating system settings of his or her local computer to a bank server available over the Internet. In step 304 the user uses his or her local computer in order to login to a web site operated by the bank server over the Internet. The user will typically supply a user name and password in order to access his or her account. The user may log in each time he starts up his computer, may log in periodically from time to time, or may log in right before a computer shut down.

In step 308 software agent 170 presents a form, list, check boxes or other suitable user interface to the user to the allow the user to select which operating system settings should be uploaded to the bank server. Preferably, the user has first performed a virus scan, malware detection process, or other suitable procedure for determining that his or her computer is currently unaffected by any malware and that the operating system settings are in a known, clean state. Preferably, the software agent presents the following operating system settings to the user for his or her selection for storage: startup program; host file, network settings; browser settings; service list; and scheduled tasks. The network settings may include: IP address, Subnet Mask, Gateway, DNS server, dial-up information, computer name, etc. The browser settings may include: Home page URL, LAB settings, proxy settings, auto configuration script, etc.

Figure 9:
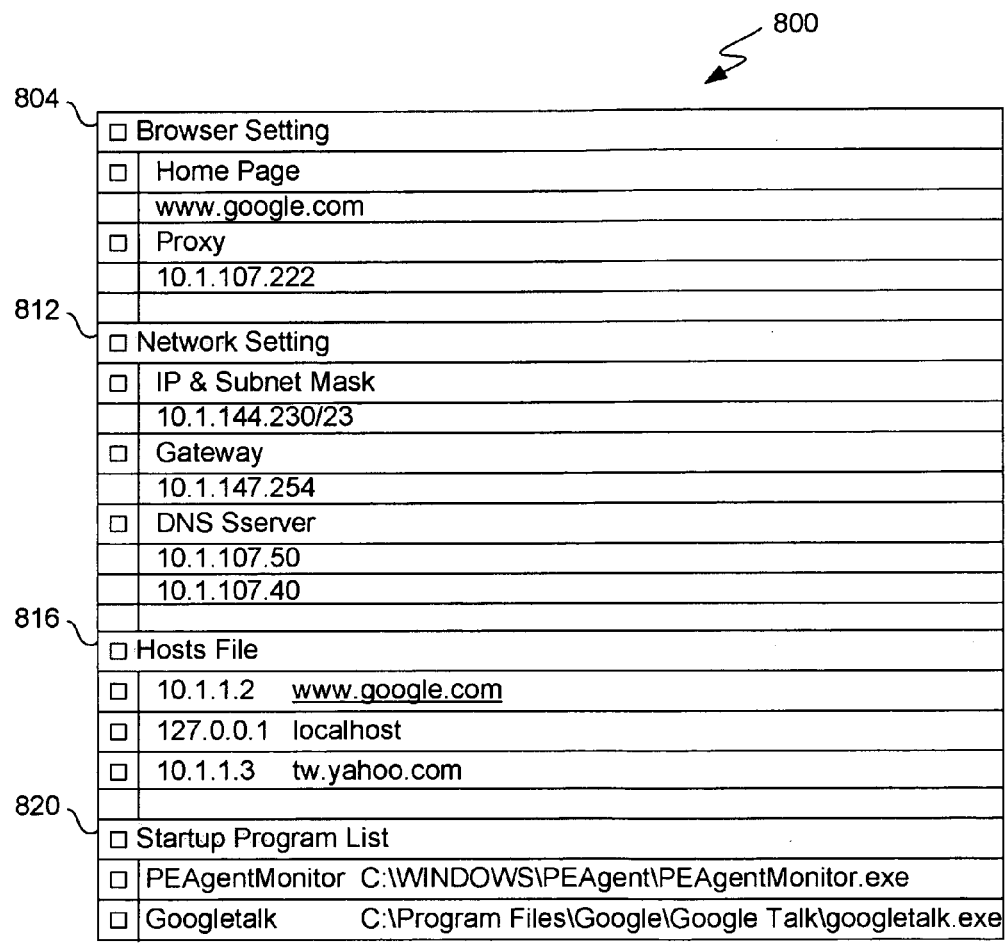
FIG. 9 illustrates an example user interface.

FIG. 9 illustrates an example user interface 800 that may be presented to the user. As shown in this example, the user is presented with browser settings 804, network settings 812, hosts file settings 816 and a startup program list 820 to be selected. Of course, many other settings may be presented to the user for selection and the startup program list could be much longer.

In step 312 the software agent recognizes and keeps track internally of those operating system settings selected by the user. Preferably, these settings are not stored separately on the user's local computer. In step 316 the software agent communicates these selected settings to the bank server over an Internet connection. In one embodiment, the software agent communicates to the bank server over a secure connection such as the "https" protocol. The software agent communicates these settings by noting which settings the user has selected, accessing these settings in their respective locations, storing this information in local memory, preparing the values for transmission, and then sending them to the bank server using the protocol mentioned above or any other suitable protocol.

In step 320 these received operating system settings are stored at the bank server. Preferably, these settings are stored in a database having fields that identify each potential operating system settings. Additionally, it is contemplated that the user name or user account number (or other identifier) will be the primary key used access to this database. Any suitable database software is acceptable for use.

In step 324 the storage location of the bank server and the user's saved operating system settings are recorded and transmitted to the user. In one embodiment, the URL of the bank server is recorded in the software agent on the user's computer, and the user may access his saved operating system settings simply by using the URL and then providing his user name, password and/or account number.

At this point, the user has saved known, clean operating system settings to a bank server accessible over the Internet so that these settings may be downloaded to a computer at a future point in time.

Retrieve Settings Flowchart

Figure 4:
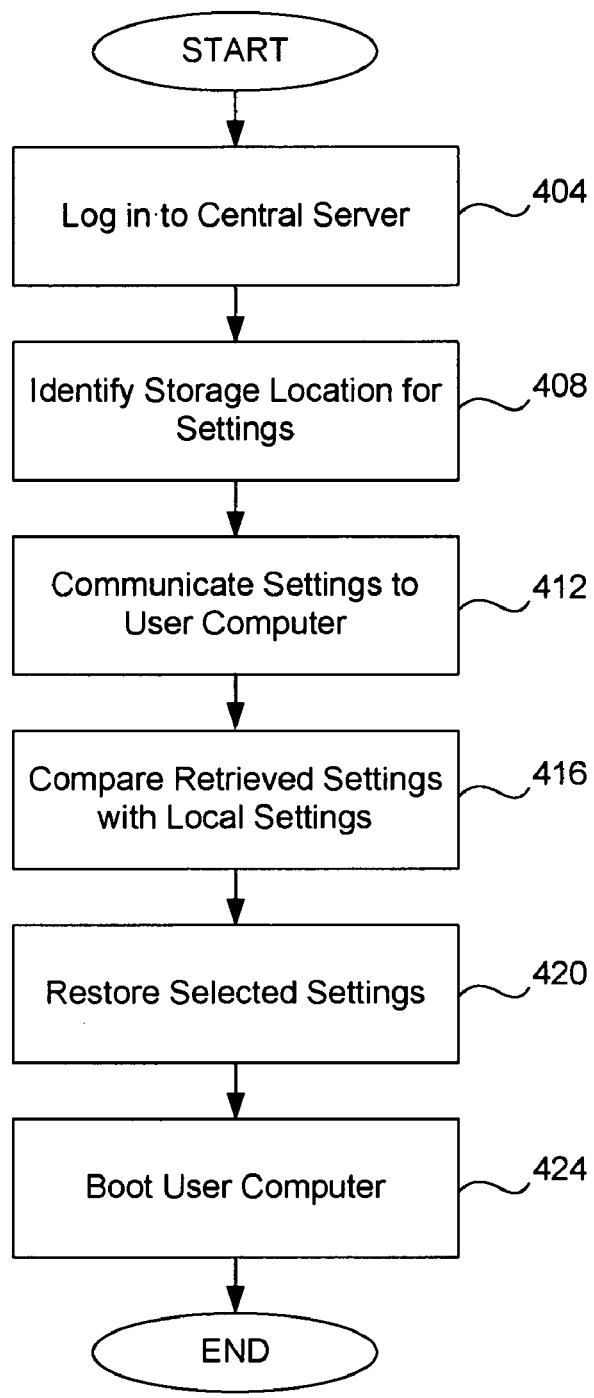
FIG. 4 is a flowchart describing one embodiment by which a user retrieves operating system settings from a bank server available over the Internet.

FIG. 4 is a flowchart describing one embodiment by which a user retrieves operating system settings from a bank server available over the Internet. In step 404 the user uses his or her local computer in order to login to a web site operated by the bank server over the Internet. The user will typically supply a user name and password in order to access his or her account. The user may log in each time he starts up his computer in order to retrieve appropriate operating system settings from the bank server. The user may also log in from time to time if he or she desires to replace the operating system settings on his or her computer. Once logged in, the software agent then communicates with the bank server. In one embodiment, the software agent is configured to contact and log in to the bank server automatically when the user computer first starts up. In this situation, the software agent will automatically retrieve operating system settings from the bank server each time the user's computer starts up.

In step 408 a storage location on the bank server is identified as the location that stores the operating system settings for this user. In one embodiment, the provision of the user name, password and account identifier by the user identifies a unique location within the database of the bank server that holds the operating system settings for this user and his or her computer.

In step 412 the operating system settings are communicated from the bank server to the user computer. Preferably, the user is presented with an option to download these settings and may choose not to download these settings in certain circumstances. The operating system settings are sent directly to the software agent on the user's computer that will then take steps to incorporate these settings.

In step 416 the software agent compares all of the retrieved settings from the bank server with the current operating system settings of the user's computer. This comparison is performed line by line, preferably, although other comparison techniques may be used.

In step 420 the user is prompted by the software agent to restore all of the retrieved settings, selected ones of the retrieved settings or none of the retrieved settings. For example, if all of the settings are the same, then the user may choose to not restore any of the settings. In one embodiment, the user is presented with a list, graphic or other suitable interface listing those operating system settings that are available to be restored. The user then selects or checks which settings should be restored from the bank server. Once selected, the software agent then copies the selected settings into their respective locations in the operating system, browser etc. In step 424 the software agent initiates a restart of the user computer in order to have these operating system settings take effect.

Restore Point Flowchart

Figure 5:
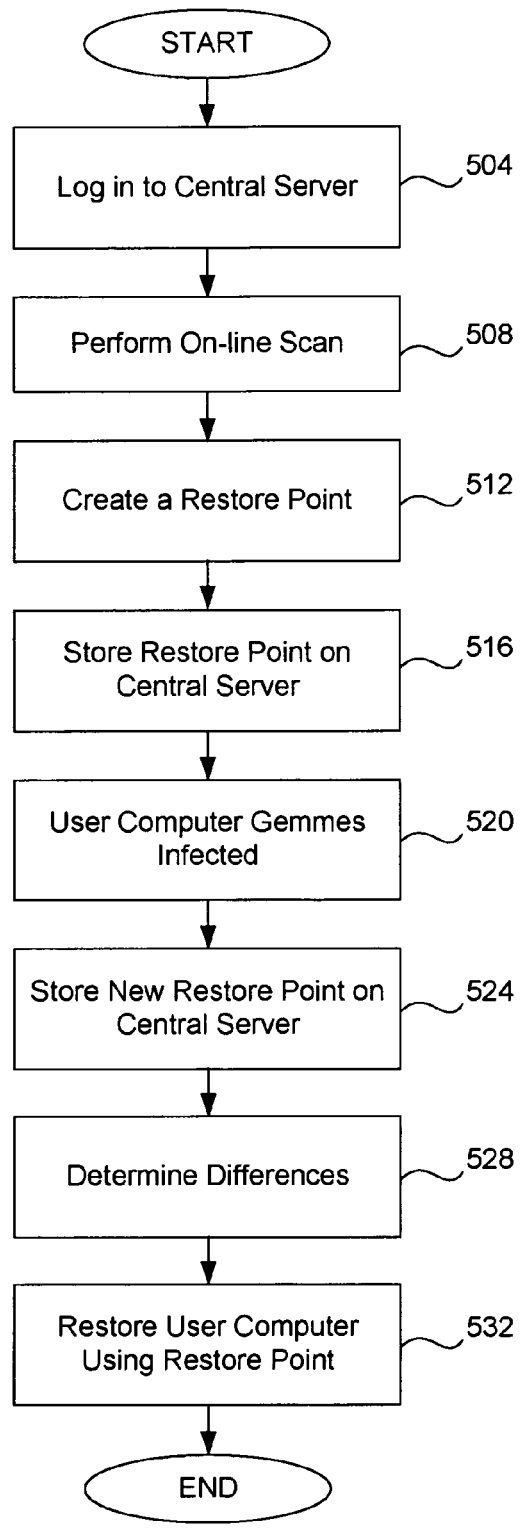
FIG. 5 is a flowchart describing one embodiment by which a user creates a restore point and stores that restore point from his or her local computer to a bank server available over the Internet.

FIG. 5 is a flowchart describing one embodiment by which a user creates a restore point and stores that restore point from his or her local computer to a bank server available over the Internet. In step 504 the user uses his or her local computer in order to log in to a web site operated by the bank server over the Internet. The user will typically supply a user name and password in order to access his or her account. The user may log in each time he starts up his computer, may log in periodically from time to time, or may log in right before a computer shut down.

In step 508 the user performs online virus scanning of his or her computer in order to determine if any malware is present. As is known in the art, a Web server is able to provide an online scanning tool that scans the user computer for malware and post the results on the Web. For example, a product such as "HouseCall" available from Trend Micro, Inc. may be used. Other online scanning tools may also be used. In general, an online scanning tool is an application that checks whether a user computer has been infected by viruses, spyware, or other malware. The online scanning tool may also perform additional security checks to identify vulnerabilities to prevent reinfection. Or, the user may perform virus scanning of his or her computer using a software product resident on the computer itself. In any case, the user views results of the scan (on the Web or on his computer) and determines if any malware is present.

Assuming that no malware is present and the user is convinced that his or her computer has not been infected, in step 512 the user creates a restore point on his or her computer. As is known in the art, creation of a restore point on a computer involves storing or backing up the operating system in order to create a baseline for future reference. This technique is also known as an image backup. The information identified and stored as part of a restore point includes: operating system settings, installed programs, running programs, operating system, necessary files, the registry, local profiles, the COM+ database, the file protection cache (e.g., wfp.dll), the Windows Management Instrumentation (WMI) database, the Microsoft IIS metabase, files in the operating system, program file folder, etc. A variety of software tools may be used to create a restore point. Examples include "Total Recovery" available from Trend Micro Inc., "System Restore" available from Microsoft Corp., and other similar tools.

In step 516 this restore point and its associated data is uploaded to the bank server and stored in a database in association with the user's account. Any suitable database may be used. Typically, the restore point is stored as a file on the bank server and the database software is used to associate the file name with a user account. As part of this step, the storage location of the bank server and the user's saved restore point is recorded and transmitted to the user. In one embodiment, the URL of the bank server is recorded in the software agent on the user's computer, and the user may access his saved restore point simply by using the URL and then providing his user name, password and/or account number. At this point, the user has saved known, clean a restore point to a bank server accessible over the Internet so that this restore point may be downloaded to a computer at a future point in time.

At some point in the future, it is possible that the user's computer will become infected or compromised by malware such as by a computer virus; this action is indicated at step 520. In certain situations it may not be possible to quarantine the infected files or possible to completely clean the user's computer to eliminate the malware or its undesirable effects. In this situation, it is desirable to restore the computer to a state prior to when the computer was infected by the malware.

Accordingly, in step 524 a user may take the step of storing a new restore point to the bank server using the technique described above with reference to steps 512 and 516. This new restore point will reflect an operating system infected by malware and is not intended to be used by the user to restore a computer. This new restore point may be analyzed in step 528 by any suitable entity to determine the effects of the malware and how such malware may be countered in the future. In addition, step 528 may involve determining differences between the old restore point and the new restore point.

In step 532 the user directs the software agent to restore the user computer using the old restore point stored on the bank server in step 512. If not already logged in to the bank server, the user first logs in to the bank server as described in step 504. In step 532 the old restore point and its associated data previously stored on the bank server are transferred back to the user computer and the original software that created the restore point is used to then restore the user computer using the downloaded restore point. Because the user has stored his original restore point onto a safe and secure bank server over the Internet at a location that is impervious to malware, the user has an assurance that the restore point has not been infected or somehow compromised by any malware. Thus, the user is confident that he can restore his computer to state prior to the malware infection by using the original restore point. Preferably, the restore point software uses the HTTP protocol to download the original restore point from the bank server and then the local software agent loads the restore point image file in order to restore the user's computer.

In an alternative embodiment, a user may also save his operating system settings to a USB flash drive instead of saving them to a bank server over the Internet. In this embodiment, the local software agent simply stores and retrieves operating system settings or the restore point from the USB drive instead of from over the Internet. FIG. 1 illustrates data (operating system settings, restore point, etc.) being saved over link 150*a* onto a USB flash drive 180, and being retrieved over link 150*b*.

Portable Operating System

A third embodiment of the invention relates to a technique for storing an entire operating system on a USB drive. Also termed a USB key, flash drive, memory stick, USB stick, etc., this small, solid state memory device using a USB interface is very flexible. Alternatively, the operating system is stored on a small, portable USB hard disk instead of the flash drive. In this fashion, the entire operating environment needed by the user (operating system, operating system settings, installed applications, etc.) are available to the user by virtue of their presence on the USB drive. When inserted into the user's computer, the USB drive detects the hardware and network present on the public computer and can adapt the operating system of the USB drive to work within that environment. The user then starts up from the operating system on the USB drive and then uses the operating system from the USB drive rather than the operating system on the hard disk of the computer. In this simple fashion, a user wanting to use a public computer need only insert their USB drive and reboot from the operating system on the USB drive.

Figure 6:
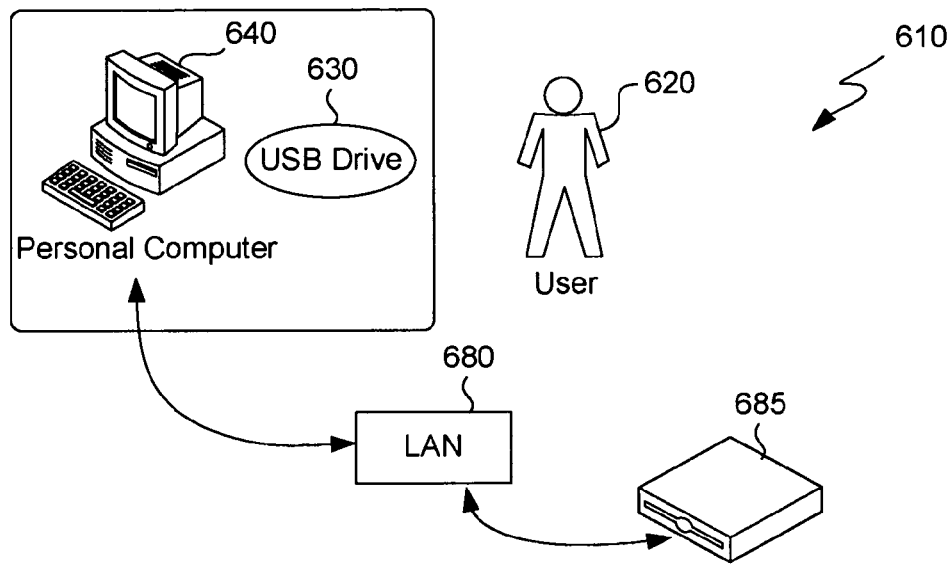
FIG. 6 illustrates a user having a personal computer (such as at the home or office) into which is inserted a USB drive.

FIG. 6 illustrates a user having a personal computer (such as at the home or office) into which is inserted a USB drive 630. The operating system and installed applications from the personal computer are loaded onto the USB drive and the user then runs his computer from the operating system on the USB drive. In the course of running the computer from the operating system on the USB drive, any settings, options or preferences the user desires are saved as part of the operating system on the USB drive. Further, the user may ensure that this operating system has appropriate security patches and updates installed, and is free from any malware. In addition, when the user starts up his computer, he has the option of starting up from either the operating system on the personal computer or the operating system on the USB drive.

Figure 7:
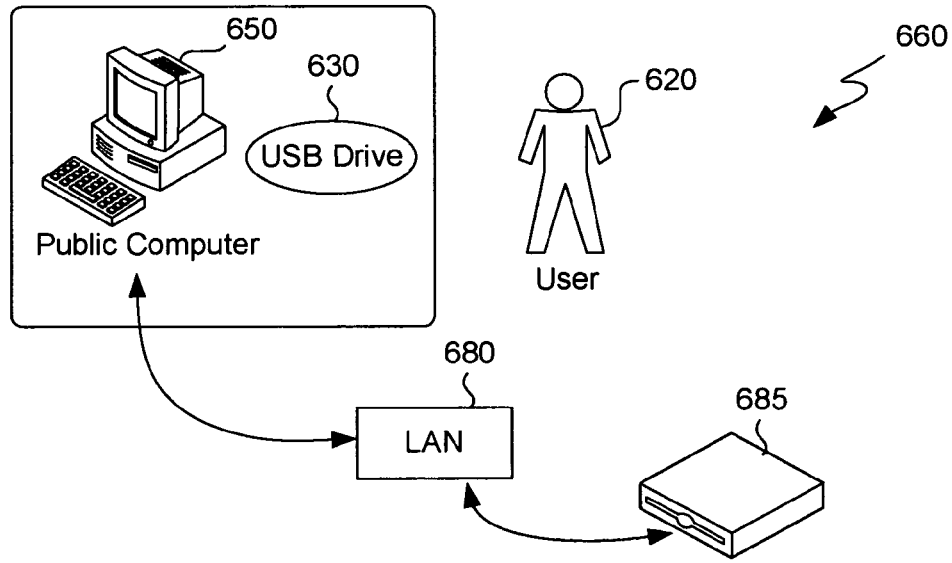
FIG. 7 illustrates a user with a computer at a remote location.

FIG. 7 illustrates a user with a computer at a remote location. Shown is a public computer 650 and the USB Drive 630 from FIG. 6. In this situation the user has brought along the USB drive from his home computer that includes the entire operating system environment and any installed applications. By plugging the USB drive into any public computer and then starting up the computer from the operating system on the USB drive, the user may then take advantage of his familiar operating environment without having to rely upon the operating system and files of the public computer which could potentially be affected by malware.

Figure 8:
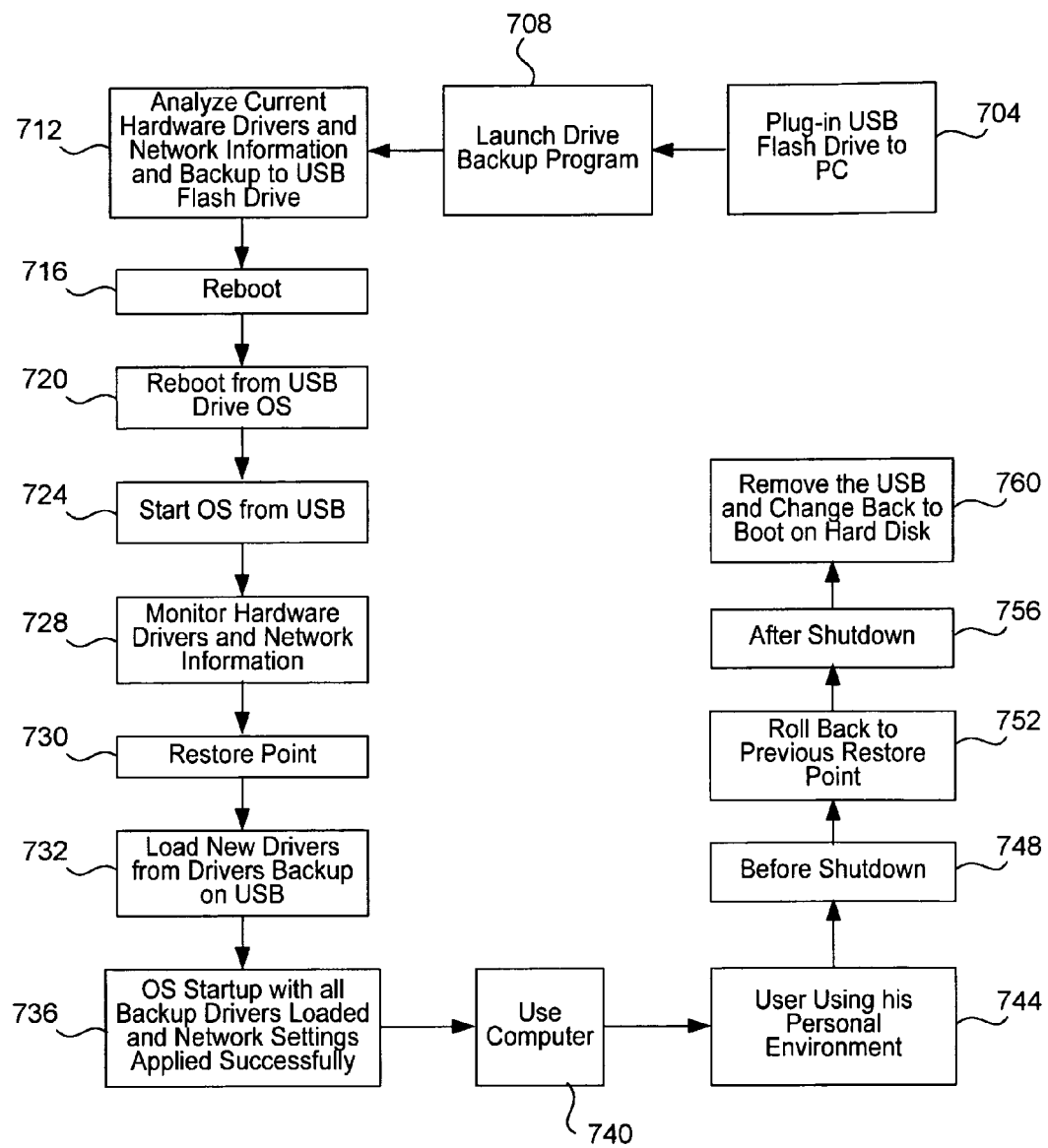
FIG. 8 is a flowchart describing use of the operating system on the USB drive.

FIG. 8 is a flowchart describing use of the operating system on the USB drive. Initially, any suitable computer operating system may be copied to and installed upon the USB drive. For example, the Microsoft operating system or the Apple operating system may be installed on the USB drive along with any default parameters and settings. Also present upon the USB drive is a backup program arranged to collect and store driver and network information. The functionality of this backup program will be made clear from the below discussion. Preferably, the operating system is installed on the USB drive without any hardware drivers. When the user first plugs the USB drive into his home computer or into any public computer the backup program will collect hardware drivers from the associated computer and install them into the USB drive as described below.

In step 704 the user plugs his or her USB drive containing a suitable operating system (and the backup program) into any public computer in any suitable location. In step 708 the backup program on the flash drive is launched or executed. This program may be executed manually by the user or by any automatic program. Because the current computer into which the flash drive has been inserted has its own hardware drivers and network information, it will be important to transfer this information from the computer to the flash drive in order to be able to use the hardware of the computer and to be able to use the Internet or other network connection while running the computer using the operating system present on the USB drive.

In step 712 the backup program performs an analysis of the current hardware drivers used in the operating system running on the computer and of the present network information on the computer. This analysis may be performed by the backup program and such techniques are known to those of skill in the art. The result of this analysis is a list of the current hardware drivers available on the computer, such as drivers for the motherboard, video card, sound or audio card, network interface card, etc. The program also makes a list of any network information on the computer such as its IP address, the netmask, any DNS settings, Gateway, dial-up program, proxy server, etc.

This information is then copied back to the flash drive. For example, all of the code for the hardware drivers are copied along with all of the network information. At this point, the hardware drivers are copied to the flash drive but not installed yet. Similarly, the network settings are copied but not yet applied. Preferably, the hardware drivers are saved into a particular folder.

Once the necessary hardware drivers and network information have been copied to the appropriate locations on the flash drive, in step 716 the user selects a reboot command from the currently running operating system of the public computer. The user directs the computer to reboot from the operating system on the flash drive. A reboot from the flash drive may be performed by using BIOS, for example, the user manually configures the computer by entering the BIOS mode.

In step 720 the public computer reboots from the operating system on the flash drive. In step 724 the operating system from the flash drive is used to begin operation of the public computer.

In step 728 the backup program on the flash drive monitors the hardware drivers and network information that have been copied from the public computer and keeps track of which drivers and which network information have been transferred. The reason for this step is that once the user has finished using the public computer (and its hardware and network connections), it would not be desirable to keep these drivers and network information within the user's operating system on the flash drive. Once the user has finished with the public computer and has shut it down, it will be desirable to restore the operating system on the flash drive to a state previous to when the public computer's hardware drivers and network information had been downloaded.

In step 730 a restore point is created for the operating system on the flash drive that specifically identifies the hardware drivers and network settings present in the user's operating system before the hardware drivers and network settings from the public computer are installed on the flash drive. One of skill in the art may create this restore point by creating a list of hardware drivers that are present. This list will be used to remove the added hardware drivers later. Alternatively, a list of the hardware drivers and network settings from the public computer may be created in order to determine at a later time that these added hardware drivers and network settings from the public computer should be deleted.

In step 732 the new hardware drivers (from the computer) are loaded (installed) into the operating system located on the flash drive. Additionally, the network settings from the public computer are also applied to the operating system on the flash drive so that they are in use.

In step 736 the operating system on the flash drive has started up and is operating successfully using the hardware drivers and the network information settings that had been transferred earlier in step 712 from the public computer.

In step 740 the user begins use of the public computer while running the operating system from his inserted USB flash drive. And in step 744 the user continues use of the computer using his personal environment that is present on the operating system on the flash drive. In particular, the user has access to any personal settings, options or preferences that are present in his personal operating system stored on the USB drive. Further, any applications that had been installed on the USB drive are available for use while using the public computer. For example, any desirable anti-virus application the user has installed on his own operating system on the flash drive is now available for use while the user uses the public computer. This anti-virus program might not normally be available on the public computer, and may be used to perform scans and to prevent malware from infecting the operating system on the flash drive, and to prevent malware from affecting the user while operating the public computer.

In step 748 the user takes steps before shutting down the public computer. For example, the user initiates a command in the operating system that will direct the backup program on the flash drive to restore the operating system on the flash drive to a previous state. In step 752 the backup program then rolls back the operating system on the flash drive to the restore point created in step 730. More specifically, the hardware drivers from the public computer that were installed in step 732 are uninstalled and the network settings that were applied in step 732 are removed. The backup program uses the restore point to perform these actions by either using a list of the newly installed hardware drivers and network settings, or by using a list of hardware drivers and network settings that were on the USB drive to begin with before the drivers and settings were added from the public computer. The USB drive and its operating system is then restored to its original state. In addition to being uninstalled, the hardware drivers and network settings from the public computer are also erased from the flash drive.

In step 756 the user performs a shutdown of the public computer. In step 760 the user removes the USB flash drive from the public computer, turns on and reboots the public computer from its hard disk so that the public computer is now using the operating system from its hard disk and is using its original hardware drivers and network settings.

In an alternative embodiment, the original operating system of the user is not stored upon a USB drive 630 but is instead stored at a suitable location over a local area network (LAN) 680. Thus, hardware drivers and network settings are transferred from the public computer over a local area network 680 to the operating system resident on any suitable drive 685 (or other disk, storage, solid-state drive, etc.). The public computer is then run from the operating system resident on this drive 685. When done, the hardware drivers and network settings from the public computer are removed from this drive as described above.

Computer System Embodiment

Figure 10A:
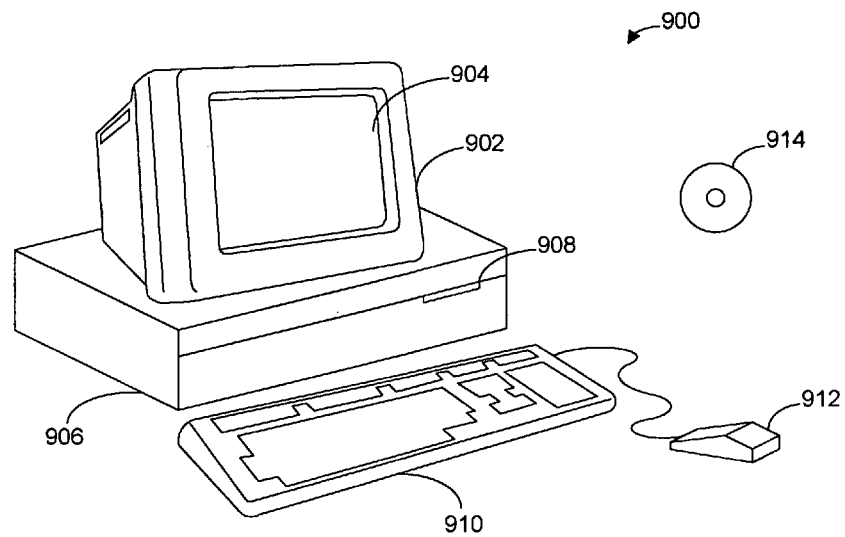
FIGS. 10A and 10B illustrate a computer system suitable for implementing embodiments of the present invention.
Figure 10B:
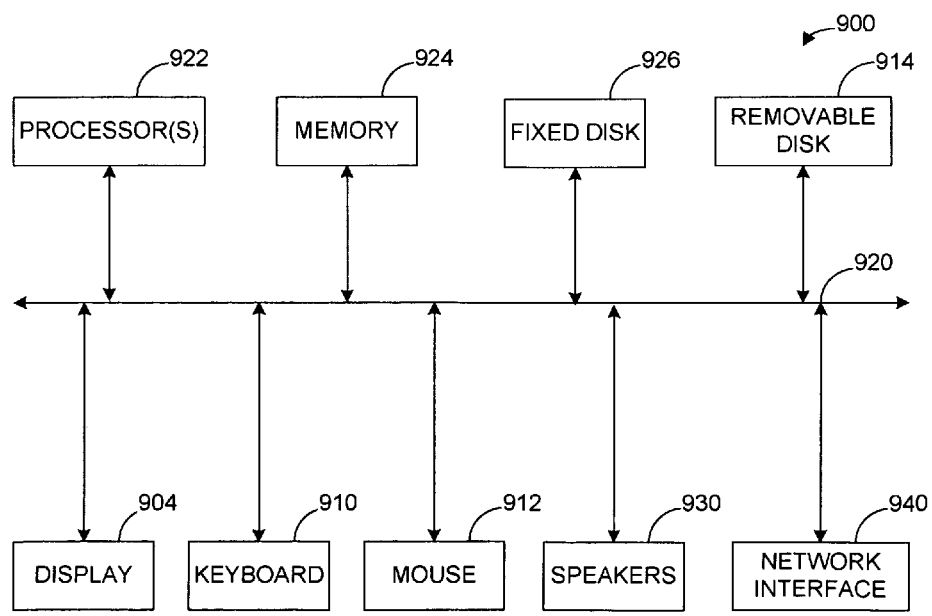

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of saving operating system settings, said method comprising:
    identifying a list of operating system settings saved within an operating system operating on a user computer;
    copying the list of operating system settings to a local memory;
    connecting to a bank server over the Internet;
    communicating said list of operating system settings and associated values to said bank server;

storing said operating system settings and their values in a database of said bank server in association with a user account;

communicating a location of said bank server to said user computer;

logging in to said bank server over the Internet from a second user computer;

comparing said operating system settings and their values to operating system settings and values existing on said second user computer; and downloading said operating system settings and their values from said bank server to said second user computer if said operating system settings and their values from said bank server do not match said operating system settings and values existing on said second user computer.

2. The method as recited in claim 1 wherein said second user computer is different from said user computer.

3. The method as recited in claim 1 wherein said steps of connecting and communicating said list are performed by a software agent on said user computer.

4. The method as recited in claim 1, wherein the operating system settings and their values include a list of startup programs of the operating system.

5. The method as recited in claim 4, wherein the list of startup programs are recorded in registry keys.

6. The method as recited in claim 5, wherein the registry keys include a hive of keys for a local machine.

7. The method as recited in claim 5, wherein the registry keys include a hive of keys for a current user.

8. The method as recited in claim 1, wherein the operating system settings and their values include a host file of the operating system.

9. The method as recited in claim 1, wherein the operating system settings and their values include network settings.

10. The method as recited in claim 9, wherein the network settings include Internet Protocol (IP) address, Subnet Mask, gateway, and Domain Name Service (DNS) server.

11. The method as recited in claim 1, wherein the operating system settings and their values include web browser settings.

12. The method as recited in claim 11, wherein the web browser settings include a home page uniform resource locator (URL).

13. The method as recited in claim 1, wherein the operating system settings and their values include a service list of processes typically running in a background of the user computer.

14. The method as recited in claim 1, wherein the operating system settings and their values include a list of tasks scheduled to run on the user computer.

15. The method as recited in claim 1, wherein the comparing is performed line-by-line.

16. A method of saving a restore point, said method comprising:

performing a virus scan of a user computer;

creating a restore point of said user computer, wherein the restore point includes operating system settings to be used for comparison with operating system settings of another computer to determine if the another computer likely has been infected with malware, wherein the restore point is stored separately from the operating system;

connecting to a bank server over the Internet;

communicating said restore point to said bank server;

storing said restore point in a database of said bank server in association with a user account; and communicating a location of said bank server to said user computer.

17. The method as recited in claim 16 further comprising:

logging in to said bank server over the Internet from said user computer;

downloading said stored restore point from said bank server to said user computer;

restoring said user computer using said downloaded restore point.

18. The method as recited in claim 17 further comprising:

performing said logging in when it is determined that said user computer has been compromised by malware.

19. The method as recited in claim 16 further comprising:

logging in to said bank server over the Internet from said user computer;

creating a second restore point of said user computer when it is determined that said user computer has been compromised by malware;

storing said second restore point in said database of said bank server in association with said user account;

determining the differences between said restore point and said second restore point on said bank server; and outputting said differences to an entity for review.

20. The method as recited in claim 16 wherein said steps of connecting and communicating said restore point are performed by a software agent on said user computer.

21. The method as recited in claim 16, wherein the operating system settings and their values include a list of startup programs of the operating system.

22. The method as recited in claim 21, wherein the list of startup programs are recorded in registry keys.

23. The method as recited in claim 21, wherein the registry keys include a hive of keys for a local machine.

24. The method as recited in claim 21, wherein the registry keys include a hive of keys for a current user.

25. The method as recited in claim 16, wherein the operating system settings and their values include a host file of the operating system.

26. The method as recited in claim 16, wherein the operating system settings and their values include network settings.

27. The method as recited in claim 26, wherein the network settings include Internet Protocol (IP) address, Subnet Mask, gateway, and Domain Name Service (DNS) server.

28. The method as recited in claim 16, wherein the operating system settings and their values include web browser settings.

29. The method as recited in claim 28, wherein the web browser settings include a home page uniform resource locator (URL).

30. The method as recited in claim 16, wherein the operating system settings and their values include a service list of processes typically running in a background of the user computer.

31. The method as recited in claim 16, wherein the operating system settings and their values include a list of tasks scheduled to run on the user computer.

* * * * *